June 21, 1966     E. A. TEETER     3,256,655
HOUSE TRAILER SKIRT
Filed April 8, 1963
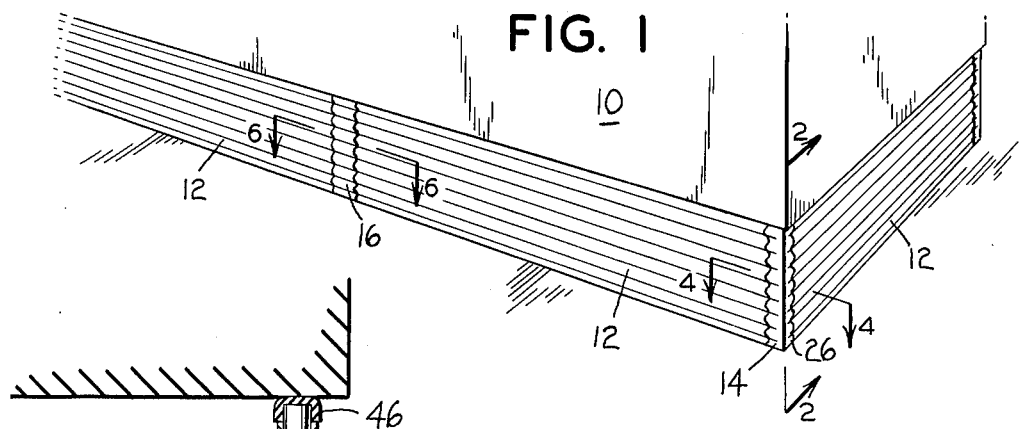
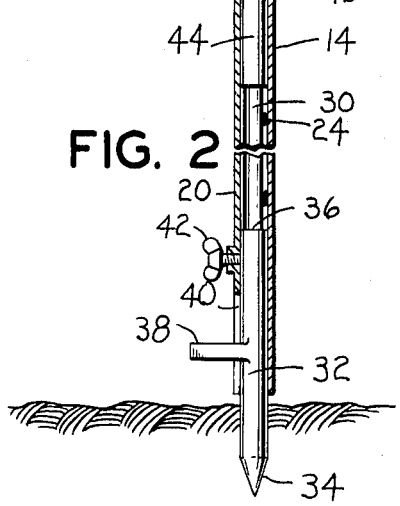
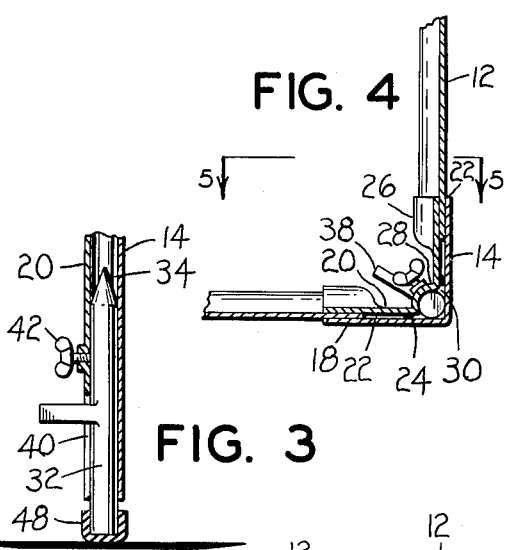
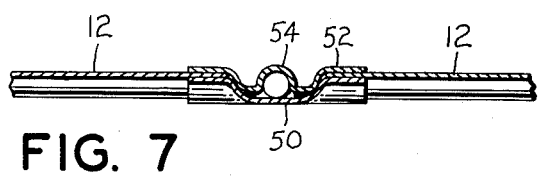
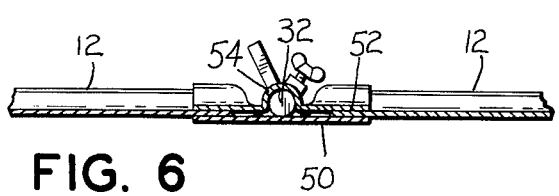
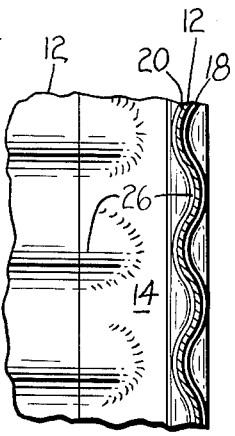
*INVENTOR.*
ELMER A. TEETER
BY *Eugene M. Eckelman*
ATTORNEY

United States Patent Office 3,256,655
Patented June 21, 1966

3,256,655
HOUSE TRAILER SKIRT
Elmer A. Teeter, 16745 SE. Division St., Portland, Oreg.
Filed Apr. 8, 1963, Ser. No. 271,067
2 Claims. (Cl. 52—127)

This invention relates to new and useful improvements in a skirt construction for enclosing the space beneath a house trailer.

A primary objective of the present invention is to provide a skirt construction for house trailers employing novel means for mounting the skirt between the bottom of the trailer and a supporting surface.

A more particular object is to provide a skirt construction for house trailers having corner and side connector portions in which is adjustably mounted supporting members adapted to support the apron selectively in position under the trailer to close the space therebeneath.

Still another object is to provide a skirt construction for house trailers having connector means in which is incorporated a support member which is reversible wherein in one position thereof it is adapted to penetrate the ground and in the other position is adapted to seat on a hard surface.

Briefly stated, the present skirt for house trailers employs panel sections which are interconnected at the corners and at the sides intermediate the corners by novel connectors. These connectors have edge pocket portions for receiving the ends of the panel sections and also include a central pocket for receiving a support member. Importantly, this member projects from the lower end of the connector and is adjustable therein for arranging it cooperatively with the supporting surface. The support member has a sharpened end for penetrating the ground and a flat end for seating on a hard surface such as concrete, and is reversible in order to direct the appropriate end downwardly.

The invention will be better understood and additional objects thereof will become more apparent from the accompanying specification and claims considered together with the accompanying drawings, wherein like numerals of reference indicate like parts, and wherein:

FIGURE 1 is a fragmentary perspective view of the present skirt construction as applied to a house trailer;

FIGURE 2 is a sectional view taken on the line 2—2 of FIGURE 1 and showing corner connector structure having the support member therein and penetrating the ground;

FIGURE 3 is a fragmentary view similar to FIGURE 2 but showing the support member inverted for seating on a hard surface;

FIGURE 4 is a fragmentary sectional view of a corner connector taken on the line 4—4 of FIGURE 1;

FIGURE 5 is a fragmentary sectional view taken on the line 5—5 of FIGURE 4;

FIGURE 6 is a fragmentary sectional view taken on the line 6—6 of FIGURE 1 and showing the structure of side connectors; and FIGURE 7 is a sectional view similar to FIGURE 6 except that it is taken at a different height on the connector.

Referring in particular to the drawings, the numeral 10 designates a house trailer which in conventional construction and usage is supported off the ground by wheels or other supporting structure, not shown. The present invention is embodied in a skirt construction adapted to extend about the perimeter of the trailer to close the space between the latter and the ground.

The present invention comprises panels 12 which preferably are constructed of corrugated metal or plastic to present an ornamental and structurally strong wall portion. These panels are interconnected by corner connectors 14 and side connectors 16 and are cut to length and height according to the dimensions of the trailer as well as its spacing from the ground.

Corner connectors 14 comprise a pair of right angle plates 18 and 20 welded together in complementary spaced relation, FIGURE 4, to provide full length edge pockets 22. The spacing of the plates 18 and 20 may be accomplished by weld material 24 or by any other suitable spacing means.

The connector 14 is straight walled adjacent the corner but the edge portions thereof have corrugations 26 for the reception of the ends of the corrugated panels 12. The spacing between the angle plates 18 and 20 is such as preferably to frictionally grip the ends of the panels 12 in a firm connection. However, it is desired that these members be separable from each other in order to disassemble the skirt.

The inner plate 20 has a rounded portion 28 centrally of the connector 14 to form in combination with the outer plate 18 a socket 30 for the reception of a support or foot member 32 best shown in FIGURES 2 and 3. This support member comprises an elongated rod one end 34 of which is pointed and the other end 36 of which is flat. Member 32 has an integral right angle lug 38 located substantially centrally of the ends. This lug projects through a bottom opening slot 40 in the inner plate 20, said slot being elongated to provide for longitudinal relative movement of the support member in the socket 30 such that the support member is movable upwardly, sufficiently to retract the lower end thereof to at least the bottom of the socket and to extend downwardly to engage or possibly penetrate a supporting surface. A set screw 42 is threadedly mounted through the wall of rounded portion 28 and is adapted to engage the foot member to anchor it in a selected position relative to the connector 14.

The upper portion of socket 30 carries an integral auxiliary rod portion 44 adapted to project above the upper edge of the connector and carry a rubber cap 46.

With particular reference to FIGURE 2, the support member 32 may be mounted in the socket 30 with the point 34 down, in which case said support member may be driven into the ground by hammer blows on the lug 38. This mounting arrangement anchors the skirt construction in a fixed position where the trailer is parked on a ground surface. However, where the supporting surface comprises a concrete slab or other hard surface, the support member 32 may be inverted, as shown in FIGURE 3, in order that the flat end 36 will project downwardly for seating on such a surface. A rubber tip 48 is mounted on the bottom end of the foot member when the latter is inverted for frictionally anchoring the connector in place.

Side connectors 16, best seen in FIGURES 6 and 7, are of structure similar to corner connectors 14 except that they are straight and not angular. They employ outer and inner plates 50 and 52, respectively, interconnected, as by welding, in spaced relation and adapted for receiving the ends of panels 12. These members also employ socket portions 54 adapted for the reception of support members 32 in a manner identical with that of the corner connectors. FIGURES 6 and 7 are similar views with the exception thta FIGURE 6 is taken at a height wherein a forward portion of a corrugation is in section and in FIGURE 7 the rearward portion of a corrugation is in section. FIGURE 7 also does not include the foot member 32.

The device is readily installed by securing one of the corner connectors 14 in place and working around the trailer, installing the panels and other connectors as necessary. As stated hereinbefore, the panels 12 engage in the edge pockets 22, which preferably is a frictional engagement to secure them firmly but releasably, whereupon if it is desired to move the trailer the skirt may be readily disassembled. In the installation of the skirt, it is mounted in an uppermost position, after setting he support members 32, by loosening the set screws 42, raising the assembly upwardly into engagement with the bottom of the trailer, and then tightening the said screw.

It is to be understood tht the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A skirt assembly for house trailers including a corner connector, said corner connector comprising a pair of right angle plates secured together in parallel inner and outer spaced relation and forming vertically extending full length side edge pockets therebetween, means in the inwardly disposed right angle plate defining an upright socket open at the bottom; a side connector spaced from said corner connector comprising a pair of straight wall plates secured together in parallel inner and outer spaced relation forming vertically extending full length side edge pockets, means in the inwardly disposed plate of the side connector defining an upright socket open at the bottom; support members disposed in the sockets of each of said corner and side connectors having longitudinal adjustable movement relative to the connectors, said support members being arranged to project downwardly beyond the bottom end of the connectors for expanding the height of the latter; means interengageable between said connectors and said support members for holding said connectors and support members in adjusted vertically expanded condition to accomplish mounted vertical engagement of the skirt between a trailer and a supporting surface; and panel sections extending between said corner connectors and said side connectors and having end portions interfitted in the side edge pockets of said corner and side connectors.

2. The skirt assembly of claim 1 wherein each of the inwardly disposed plates of said corner and side connectors has a vertical slot and each of said support members is sharpened at its lower end and has a lug projecting outwardly through said slots for driving the said support members into the ground.

References Cited by the Examiner

UNITED STATES PATENTS

| | | | |
|---|---|---|---|
| 94,195 | 8/1869 | Fisher | 52—153 |
| 712,259 | 10/1902 | Carr | 256—24 |
| 829,397 | 8/1906 | Gerber | 61—49 X |
| 1,219,208 | 3/1917 | Zahner et al. | 52—238 |
| 2,575,572 | 11/1951 | Wickstrum | 135—15 |
| 2,612,335 | 9/1952 | Saltzman | 135—56 |
| 3,106,411 | 10/1963 | Holmes | 280—150 |
| 3,113,357 | 12/1963 | Reukauf et al. | 280—150 X |

FRANK L. ABBOTT, *Primary Examiner.*

JACOB L. NACKENOFF, *Examiner.*

K. E. PAYNE, L. R. RADANOVIC, *Assistant Examiners.*